US008780092B2

(12) United States Patent
Weitbruch et al.

(10) Patent No.: US 8,780,092 B2
(45) Date of Patent: Jul. 15, 2014

(54) METHOD AND DEVICE FOR DRIVING A DISPLAY DEVICE WITH LINE-WISE DYNAMIC ADDRESSING

(75) Inventors: Sébastien Weitbruch, Niedereschach (DE); Cédric Thebault, Villingen-Schwenningen (DE); Rainer Schweer, Niedereschach (DE)

(73) Assignee: Thomson Licensing, Issy-les-Moulineaux (FR)

( * ) Notice: Subject to any disclaimer, the term of this patent is extended or adjusted under 35 U.S.C. 154(b) by 1575 days.

(21) Appl. No.: 11/177,276

(22) Filed: Jul. 8, 2005

(65) Prior Publication Data

US 2006/0034144 A1 Feb. 16, 2006

(30) Foreign Application Priority Data

Jul. 9, 2004 (EP) .................................... 04291751

(51) Int. Cl.
*G06F 3/038* (2013.01)

(52) U.S. Cl.
USPC ............................................ 345/204; 345/60

(58) Field of Classification Search
USPC ........ 345/87, 60–83, 204, 690–693, 213–215
See application file for complete search history.

(56) References Cited

U.S. PATENT DOCUMENTS 5,757,338 A * 5/1998 Bassetti et al. ................. 345/3.2
6,057,809 A * 5/2000 Singhal et al. ................. 345/3.3
6,107,978 A 8/2000 Nagaoka et al.
6,175,194 B1 1/2001 Saegusa et al.
6,518,943 B1 2/2003 Masumura
7,193,596 B2 3/2007 Shibata et al.
2002/0044118 A1 4/2002 Sekido et al.
2003/0218583 A1 11/2003 Hasagawa

FOREIGN PATENT DOCUMENTS

| | | |
|---|---|---|
| EP | 1 139 324 A2 | 10/2001 |
| EP | 1139324 A2 * | 10/2001 |
| EP | 1164562 | 12/2001 |
| EP | 1 271 463 A2 | 1/2003 |
| EP | 1310935 | 5/2003 |
| EP | 1365382 A1 * | 11/2003 |
| GB | 2326512 | 12/1998 |
| JP | 8320668 | 12/1996 |
| JP | 9179520 | 7/1997 |
| JP | 11024627 | 1/1999 |
| JP | 11352917 | 12/1999 |
| JP | 2000338932 | 12/2000 |
| JP | 2001282165 | 10/2001 |

(Continued)

OTHER PUBLICATIONS

Patent Abstracts of Japan, vol. 2002, No. 10, Oct. 10, 2002, & JP 2002/182612 (Sony Corp.), Jun. 26, 2002. (Abstract and translation will follow when available).
Search Report dated Nov. 3, 2004.

*Primary Examiner* — Liliana Cerullo
(74) *Attorney, Agent, or Firm* — Myers Wolin LLC

(57) ABSTRACT

The EMI spectrum of a display device is to comply with respective norms. Therefore, the clock for loading data into data drivers of a display panel is designed to be variable. Consequently, the electromagnetic radiation produced by the loading clock is broadened thereby reducing the peak amplitude. Thus, the limitations of radiation norms can be complied with.

6 Claims, 11 Drawing Sheets

(56) References Cited

FOREIGN PATENT DOCUMENTS

| | | |
|---|---|---|
| JP | 2002/182612 | 6/2002 |
| JP | 2003140600 | 5/2003 |
| JP | 2004061702 | 2/2004 |
| JP | 2004117911 | 4/2004 |
| JP | 2005070488 | 3/2005 |
| WO | WO2004/040542 | 5/2004 |

* cited by examiner

METHOD AND DEVICE FOR DRIVING A DISPLAY DEVICE WITH LINE-WISE DYNAMIC ADDRESSING

This application claims the benefit, under 35 U.S.C. §1.19 of European Patent Application 04291751.8, filed Jul. 9, 2004.

FIELD OF THE INVENTION

The present invention relates to a method for driving a display device having a plurality of cells or pixels by loading addressing data into a data driver at a loading frequency and applying an addressing signal to at least one of said plurality of cells or pixels for an addressing time period corresponding to an addressing frequency. Furthermore, the present invention relates to a corresponding device for driving a display device.

BACKGROUND OF THE INVENTION

Today, the Plasma technology makes it possible to achieve flat colour panels of large size and with very limited depth without any viewing angle constraints. The size of the displays may be much larger than the classical CRT picture tubes.

Referring to the last generation of European TV, a lot of work has been done to improve its picture quality. Consequently, a new technology like the Plasma one has to provide a picture quality as good as or better than the old standard TV technology. In the field of picture quality, the brightness of the screen is of paramount importance.

However, the electronic parts of the actual plasma technology give rise to electromagnetic radiation. In order to assure the compatibility of PDP (plasma display device) products with other electronic components (VCR, DVD, PC, Mobile phone . . . ), it is necessary to put a filter in front of the screen. Two major sources of radiation exist:

- Sustain frequency (a solution is not subject of the current document)
- Data driving (a solution is presented in the current document)

For the rest of the document, the case of a standard PDP using 40 MHz data drivers shall be considered in order to simplify the exposition. The selling of such a product requires given norms to be respected in the fields of radiation as shown FIG. 1, for the case of data drivers working at 40 MHz and high content screen (cell R, G, B alternately ON and OFF).

The limit for consumer applications according to the European norm is depicted in the figure (class B norm). One peak linked to the data driver frequency (40 MHz), exceeds the limit of the norm. In order to fulfil the requirements of the norm, a front filter may be applied in front of the panel. One goal of this filter is to suppress the EMI (Electro-Magnetic Interference) using the so-called faraday principle: the filter is a transparent layer covered by a thin grid of metal. The basic assembly of a screen with a filter is illustrated in FIG. 2. The panel 1 together with the drivers 2 and the power electronic 3 is arranged in a housing 4 which stops the EMI at the backside of the display device. The front filter 5 in front of the panel 1 stops the EMI emitted from the front side of the panel.

Nevertheless, this filter 5 has only a reduced transparency with an actual value between 50% and 60% for consumer applications (for professional applications the norm is not so strict and the transparency is better: 65% to 75%). This filtering is really mandatory since if the front filter is removed from a plasma panel, even an IR remote control is not able to work properly. In other words, if the brightness shall be increased as well as the addressing speed also the radiation will be increased, that will require a stronger filter with even less transparency.

For further reducing the EMI related to the data driving it is necessary to know some aspects of PDP data driving.

In order to activate the plasma cells before lighting a first stage called writing or addressing stage has to be performed. During this stage, each line electrode (compare FIG. 3) of the PDP will be selected one after the other by respective drivers Line Driver 1, Line Driver 2 etc. During each selection, binary data information (cell ON or OFF) will be given on all the data electrodes Y (column electrodes) at one time. To do that, the column electrodes Y are linked to so-called data drivers Data Driver 1 to Data Driver 27 which act as registers (serial input and parallel output) working at a given data clock (e.g. 40 MHz in the present example). The line and data drivers are controlled and driven by PDP controller. Furthermore, the line electrodes X are arranged on a front plate of a PDP and the column electrodes Y on the back plate. In the concrete case of a single scan WVGA PDP having a screen with 852 pixels×480 lines 852×3 (R+G+B)=2556 cells have to be written through data drivers. Today drivers have commonly two parallel inputs and 96 parallel outputs to the column electrodes Y so that 48 clocks are needed to load the driver (48/40=1.2 μs). Finally, since 2556/96=26.625, 27 data drivers are required to write all the cells. The 36 data outputs that are in excess, will not be connected but will be filled up with zeros (OFF) from the plasma control IC.

In this connection it has already been proposed to have a jitter in the data clock. This means that various clocks for each cell at each point of time are used. In that case a jitter generator is added on the data driver clock with a kind of random effect. However, one has to guarantee that the overall loading speed will not exceed the expected writing speed. Such appliance of jitter is not very efficient.

Moreover, according to the document EP 1 365 382 various addressing time periods per line may be used as shown in FIG. 4. The length of the addressing period is different from line to line. Concerning the evolution of the addressing time per line there are three categories of dependency:

- A panel homogeneity dependency: this parameter is related to the fact that the panel does not have the same behaviour among the whole screen.
- A dependency of priming efficiency: the priming operation enables a rapid writing but its efficiency could decrease in time (depending on panel technology).
- A dependency of sustain efficiency: the writing operation is directly followed by the sustain operation. Since the efficiency of the writing operation is linked to the capacity effect of the panel, this could change with the delay to the sustain operation.

In the amount of sub-fields there may be two different categories as already explained in a previous document EP 1 250 696:

- Sub-field preceded by a priming also called primed sub-field (PSF)
- Sub-field not preceded by a priming also called refreshing sub-field (RSF)

In FIGS. 5 and 6 two examples of addressing time per PDP lines for the two previous categories of sub-fields are depicted.

FIG. 5 shows an example of the overall addressing speed for a primed sub-field. In a region around line 160 the addressing time is lower than 1 μs per line. At the large line numbers the addressing time per line increases rapidly.

In contrast to that FIG. 6 shows an example of the overall addressing speed for a non-primed sub-field. Although the addressing time is always larger than 1 µs per line it does not essentially increase at the large line numbers.

Obviously, depending on the panel technology, the curve of the addressing speed can have different behaviours. All the curves presented here are only examples related to a specific technology. In any case, a characterization of the panel speed should be made specifically for each technology and each new process.

However, according to the technology introduced in EP 1 365 382 only the addressing speed was changed. In other words, the clock of the data drivers should correspond to the fastest addressing period per line to suit various addressing speeds as disclosed in EP 1 365 382:

In case of FIG. 5, the fastest addressing speed is 0.93 µs requiring a data driver working at 51.61 MHz.

In case of FIG. 6, the fastest addressing speed is 1.23 µs requiring a data driver working at 39.02 MHz.

Indeed, it is necessary to have the data drivers (compare FIG. 3) loaded before writing (i.e. addressing) the line and so the only requirement is to have a loading speed smaller than the addressing period. The loading speed and consequently the data driver clock is kept constant. However, this has a dramatic impact on the EMI as explained in the introduction.

SUMMARY OF THE INVENTION

In view of that the object of the present invention is to provide a method and a device for driving a display panel wherein the emitted EMI fulfils the requirement of the respective norms.

According to the present invention this object is solved by a method for driving a display device having a plurality of cells or pixels by loading addressing data into data driving means at a loading frequency and applying an addressing signal to at least one of said plurality of cells or pixels for an addressing time period corresponding to an addressing frequency on the basis of said addressing data, wherein said loading frequency of the addressing data is continuously adaptable to said addressing frequency.

Furthermore, there is provided a device for driving a display device having a plurality of cells or pixels including data driving means for applying an addressing signal to at least one of said plurality of cells or pixels for an addressing time period corresponding to an addressing frequency and controlling means for loading addressing data into said data driving means at a loading frequency, wherein said controlling means is designed to continuously adapt said loading frequency to said addressing frequency.

The major advantage of the present invention is that the loading clock of the data drivers may be matched exactly to the addressing duration. Such different clocking broadens the spectrum of the EMI radiation so that the norm limitations can be fulfilled.

In the remainder of the description, loading speed and loading frequency are used indifferently for designating loading frequency. In the same manner, addressing speed and addressing frequency are used for designating addressing frequency.

The loading frequency may depend on the presence of a priming signal. Since the addressing frequency varies with the presence of the priming signal, also the loading frequency will do so. Thus, the application of a priming signal has to be regarded for controlling the loading frequency.

The loading frequency may vary with the line number of the screen of the display device (e.g. vertical panel behaviour). Specifically, since the addressing frequency continuously varies with the line number, also the loading frequency changes continuously so that the EMI spectrum is broadened.

The addressing frequency may be changed in dependence on a line number by using a first look up table (LUT). Similarly, since the loading frequency may be changed in dependence on the line number by using a second LUT. Such LUTs enable a simple handling of signal dependencies.

BRIEF DESCRIPTION OF THE DRAWINGS

Exemplary embodiments of the invention are illustrated in the drawings and are explained in more detail in the following description. The drawings showing in.

DESCRIPTION OF PREFERRED EMBODIMENTS

Figure 5:
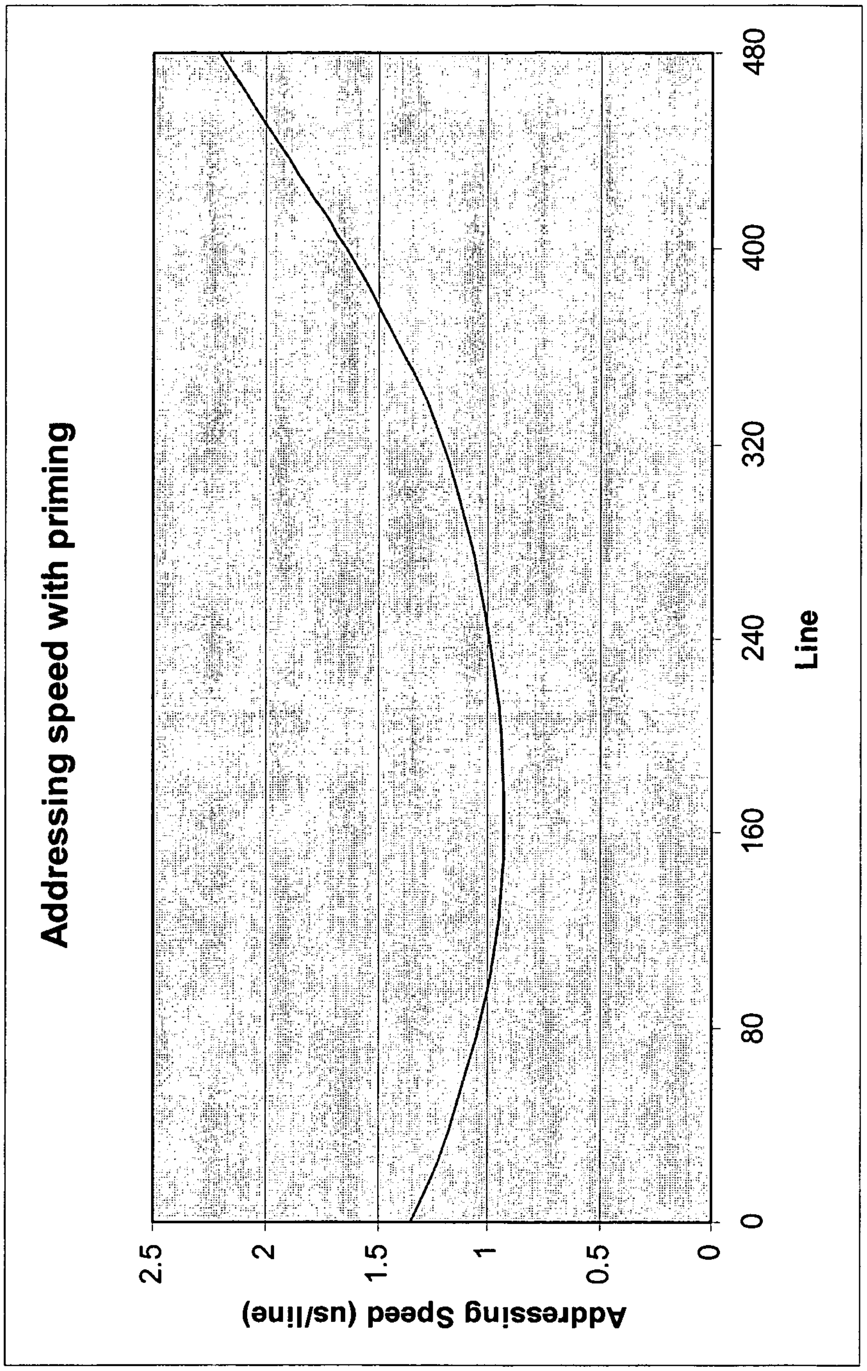
FIG. 5 the addressing speed for a primed sub-field versus the line number.
Figure 6:
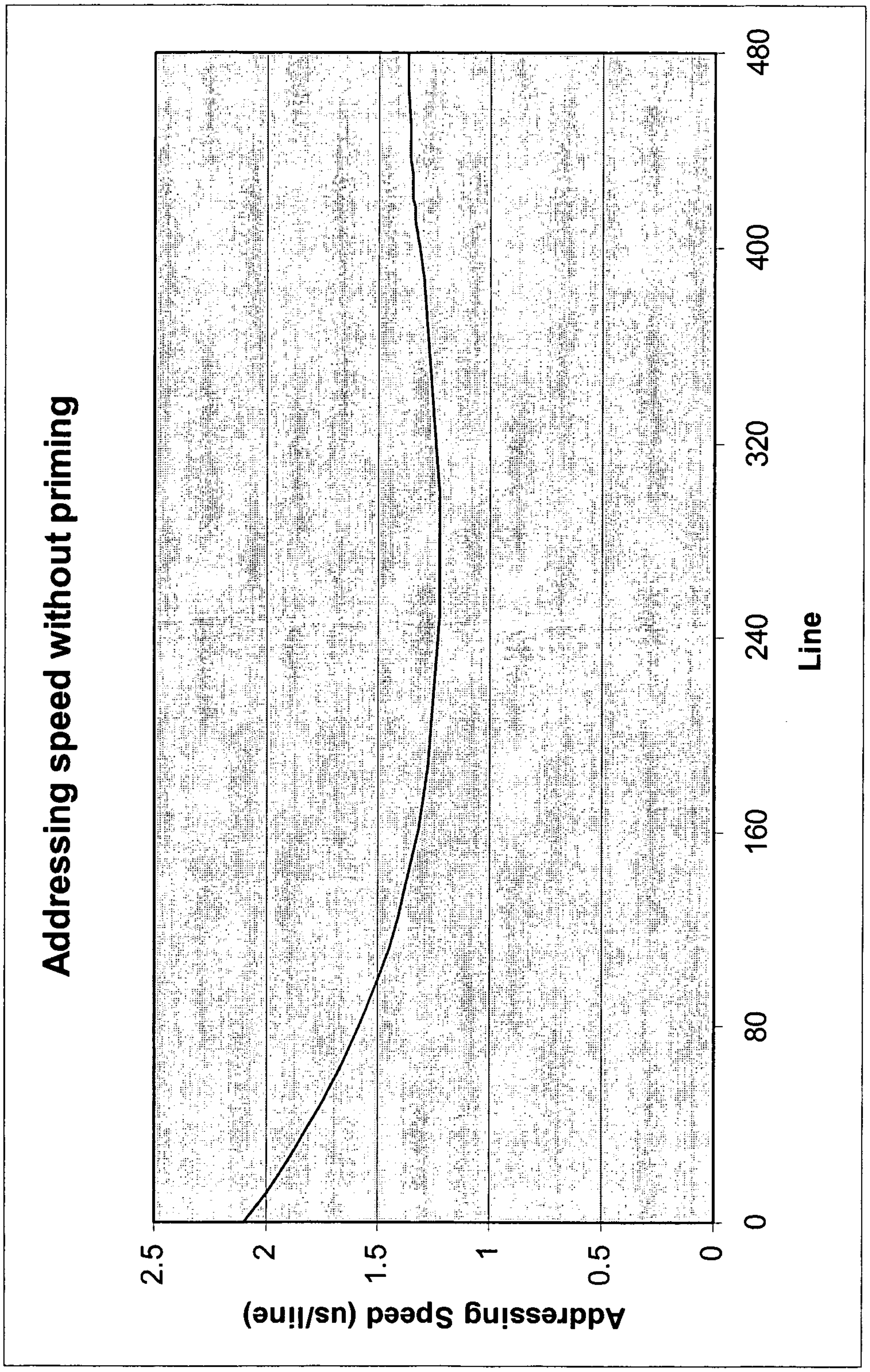
FIG. 6 the addressing speed for a non-primed sub-field versus the line number.

The main idea of the present invention is to adapt the loading speed precisely to the addressing period. A preferred embodiment shall be presented by the way of the example of FIG. 5, wherein the sub-fields are primed.

| | | |
|---|---|---|
| Line 0: | 1.35 µs⇨ | 35.6 MHz |
| Line 25: | 1.23 µs⇨ | 39.03 MHz |
| Line 50: | 1.13 µs⇨ | 42.49 MHz |
| Line 75: | 1.05 µs⇨ | 45.72 MHz |
| Line 100: | 0.99 µs⇨ | 48.49 MHz |
| Line 125: | 0.95 µs⇨ | 50.54 MHz |
| Line 150: | 0.93 µs⇨ | 51.62 MHz |
| Line 175: | 0.93 µs⇨ | 51.62 MHz |
| Line 200: | 0.94 µs⇨ | 51.07 MHz |
| Line 225: | 0.97 µs⇨ | 49.49 MHz |
| Line 250: | 1.01 µs⇨ | 47.53 MHz |
| Line 275: | 1.06 µs⇨ | 45.29 MHz |
| Line 300: | 1.14 µs⇨ | 42.11 MHz |
| Line 325: | 1.23 µs⇨ | 39.03 MHz |
| Line 350: | 1.34 µs⇨ | 35.83 MHz |
| Line 375: | 1.48 µs⇨ | 32.43 MHz |
| Line 400: | 1.63 µs⇨ | 29.45 MHz |
| Line 425: | 1.81 µs⇨ | 26.51 MHz |
| Line 480: | 2.20 µs⇨ | 21.82 MHz |

Figure 7:
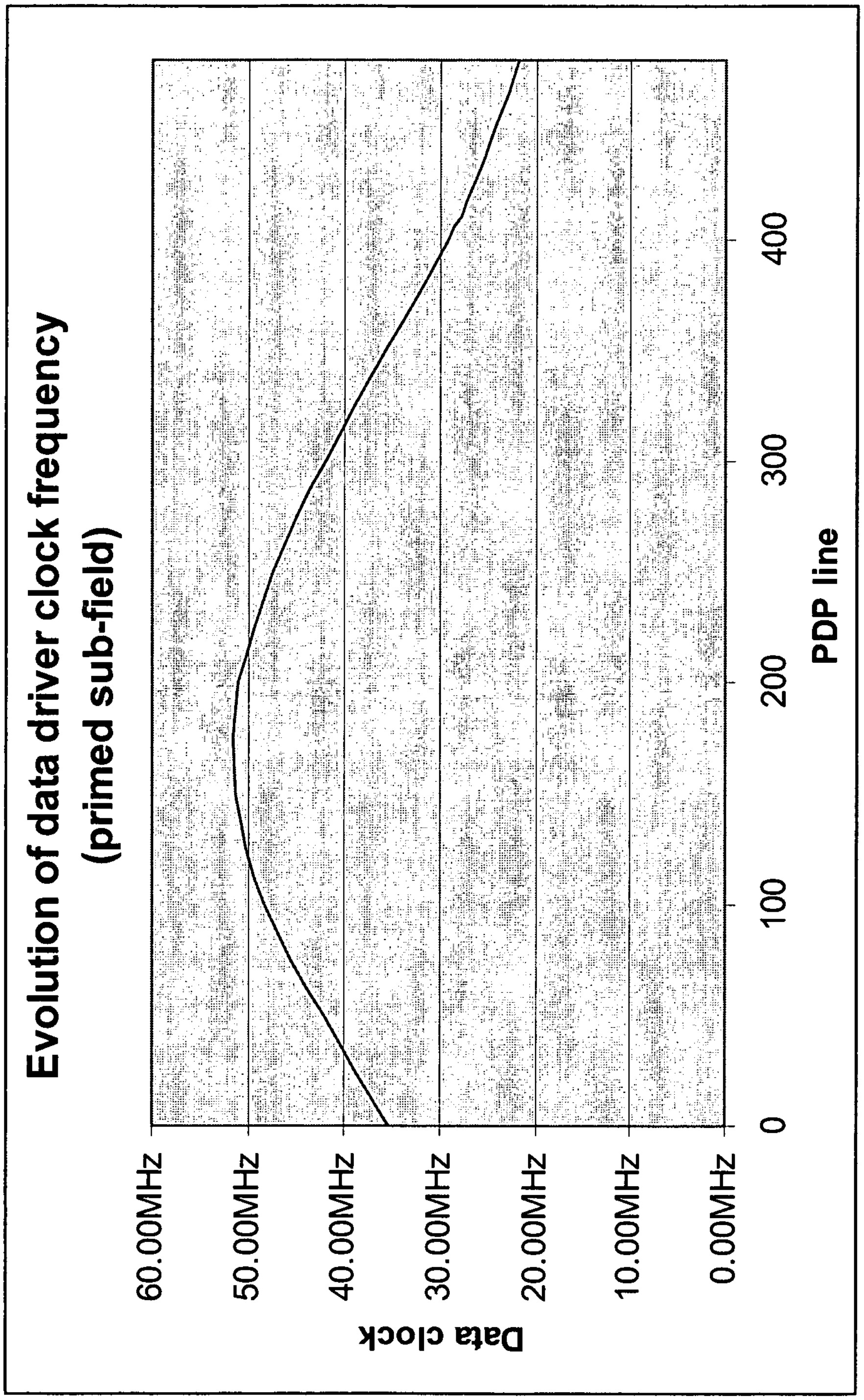
FIG. 7 the clock frequency of a data driver for primed sub-fields according to the present invention.

In the list, the first column represents a line to be addressed, the second column the required speed addressing time per line and the last one the current data clock to be used at the data driver for the corresponding line. In FIG. 7 the data clock for the case of a primed sub-field is printed over the line number. The average frequency is 41.21 MHz in this example. The maximal clock is 51.50 MHz whereas the minimum one is 21.82 MHz.

Figure 8:
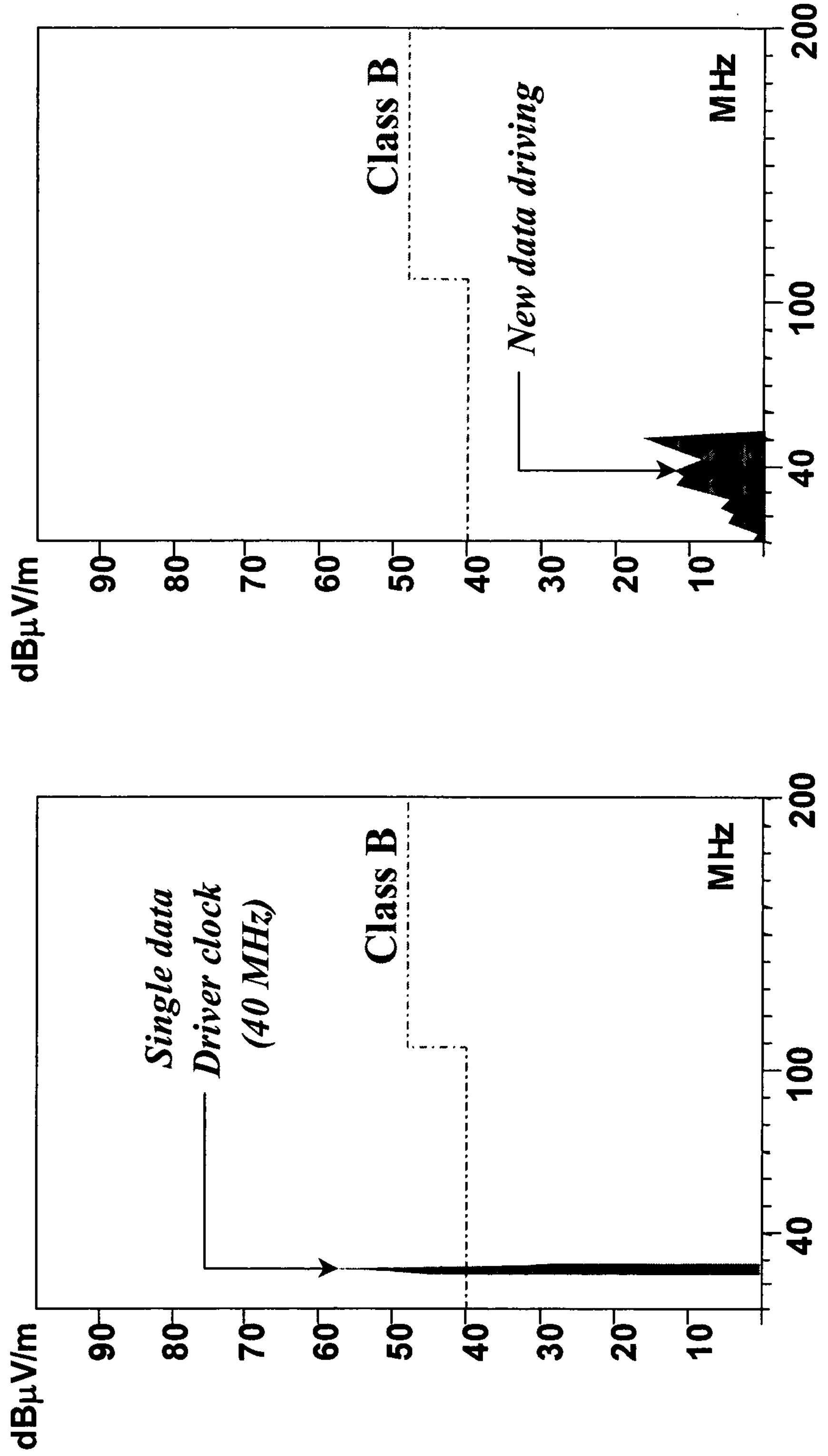
FIG. 8 a comparison of EMI spectra for a fixed driver clock and a variable driver clock.

The result of the invention on the EMI spectrum is illustrated in FIG. 8 wherein the analysis of the radiation is restricted to the data driving. The left half of the figure shows the spectrum for a fixed driver clock, whereas the right half illustrates the broadened spectrum of the varied driver clock.

The energy emitted by the data driving electronic part did not change but the energy has now been spread on a larger frequency range so that each peak is reduced in amplitude. With such an approach, it will be possible to respect the various norms with a front filter having a better transparency since less energy should now be filtered.

Figure 9:
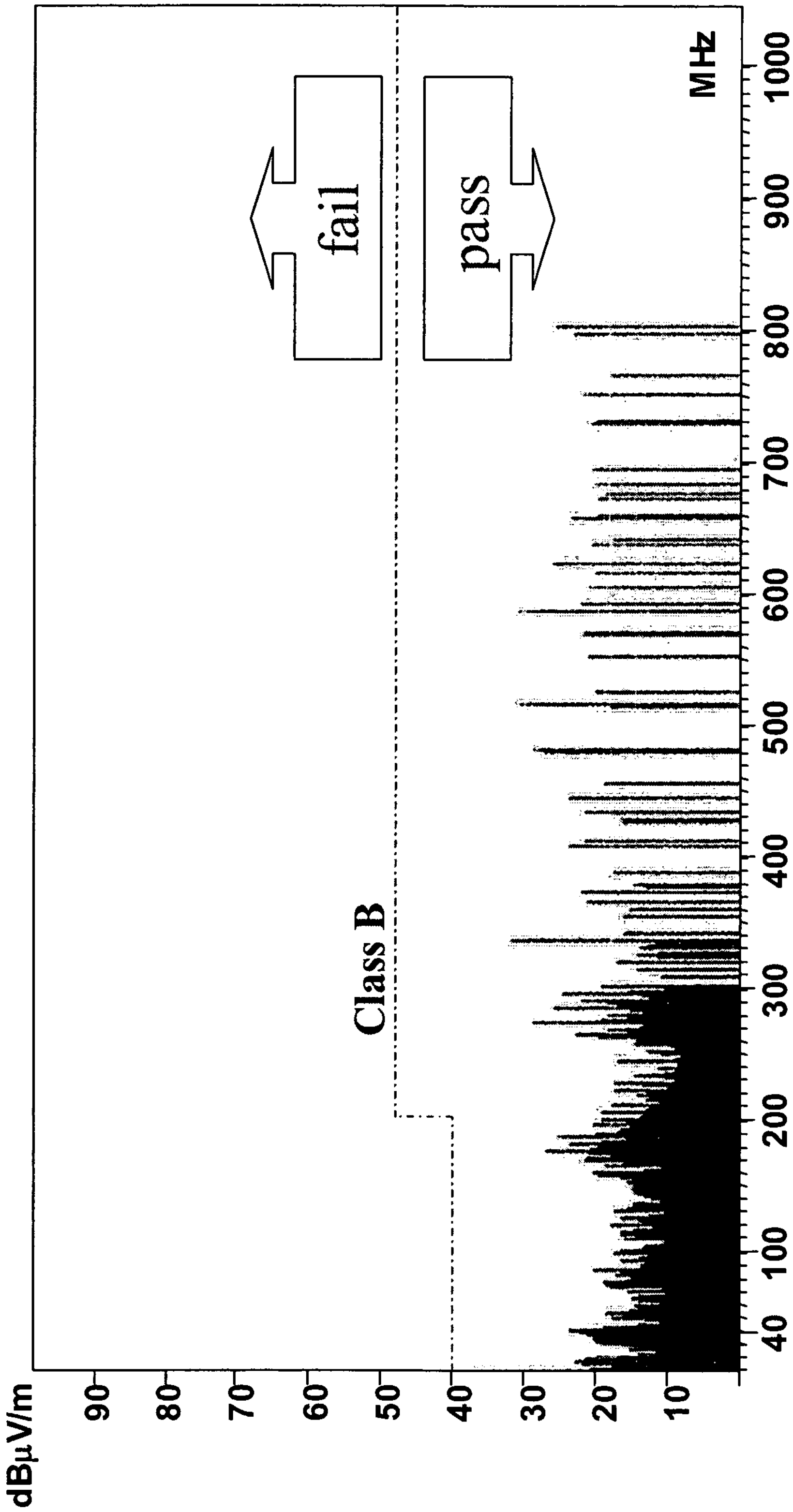
FIG. 9 an overall EMI spectrum of a PDP according to the present invention.

The overall spectrum of the chosen example is shown in FIG. 9. Even in the frequency range below 100 MHz the spectrum clearly lies under the norm limitation symbolized by the dash-dot-line. Thus, the PDP of the present example passes the class B norm.

Figure 10:
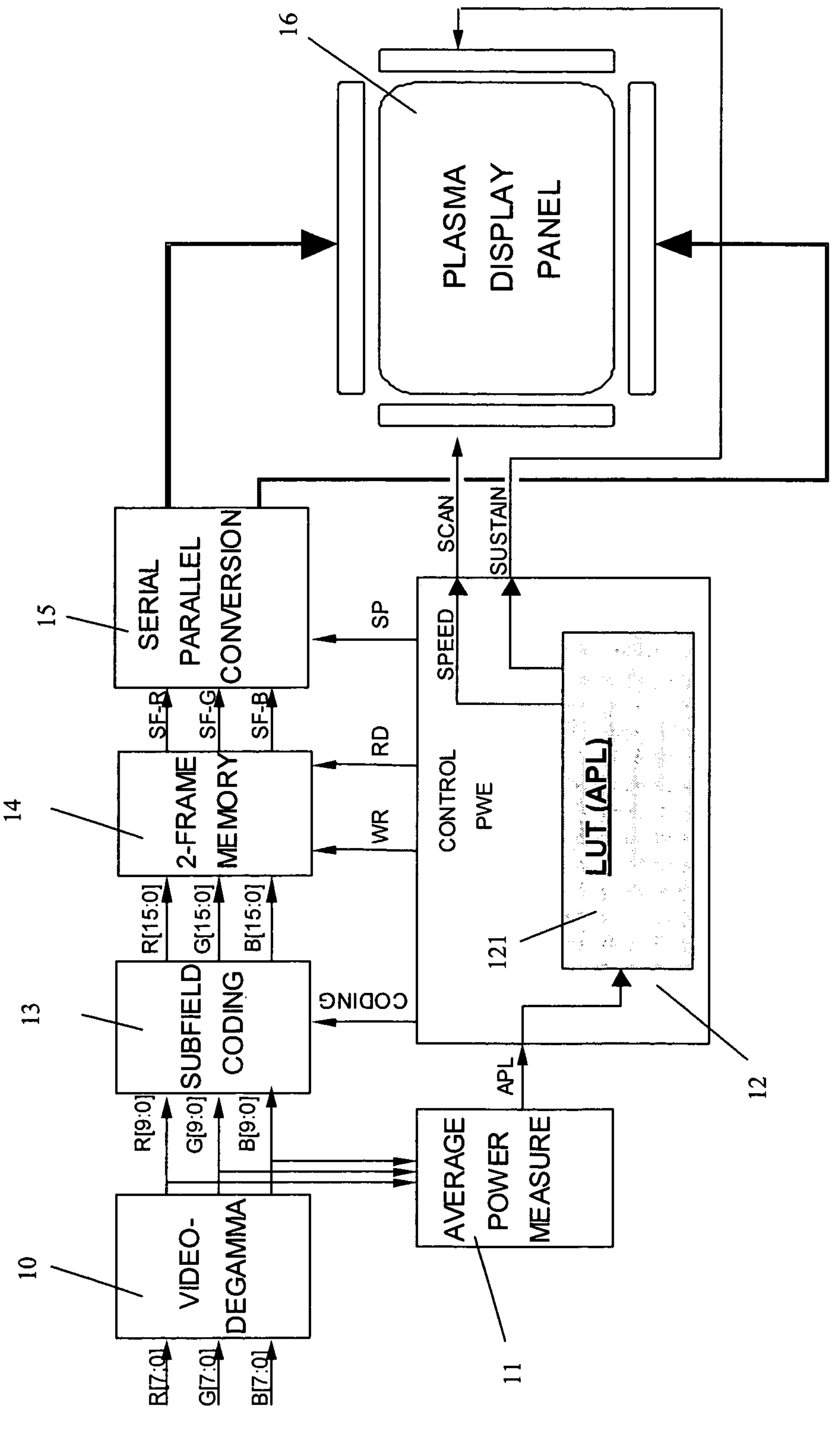
FIG. 10 a block diagram of a hardware implementation of an embodiment of the present invention.

FIG. 10 represents a possible implementation of an apparatus for carrying out the method of the present invention. This type of apparatus is already described in PCT application WO 00/46782. It comprises a video degamma circuit 10. RGB data coded with 8 bits are input to this degamma circuit 10. 10 bit-RGB-data output from the video degamma circuit 10 is analyzed on an average power measure block 11 which gives the computed average power value (APL) to a PWE (peak white enhancement) control block 12. One computation can be done as follows:

$$APL = \frac{1}{3 \cdot M} \cdot \sum_{m=1}^{m=M} (R_m + G_m + B_m)$$

where M represents the total amount of pixels. The control block 12 consults its internal power level mode table located in a LUT 121 and directly generates the selected mode control signals for the other processing blocks. It selects the sustain table to be used and the sub-field encoding (CODING) table to be used in the sub-field coding block 13 which generates 16 bit output data from the 10 bit input data from the video degamma circuit 10.

The control block 12 also controls the writing of RGB pixel data in a frame memory 14 (WR), the reading of RGB sub-field data from the second frame memory (RD), and the serial to parallel conversion circuit 15 (SP). The converted data are output to a PDP 16.

Two frame memories receiving the 16 bit data from the sub-field coding block 13 are required. Data is written pixel-wise, but read sub-field-wise into the conversion circuit 15 (SF-R, SF-G, SF-B). In order to read the complete first sub-field a whole frame must already be present in the memory. In a practical implementation two whole frame memories 14 are present, and while one frame memory is being written, the other is being read, avoiding in this way reading the wrong data. In a cost optimized architecture, the two frame memories 14 are probably located on the same SDRAM memory IC, and access to the two frames is time multiplexed.

Figure 1:
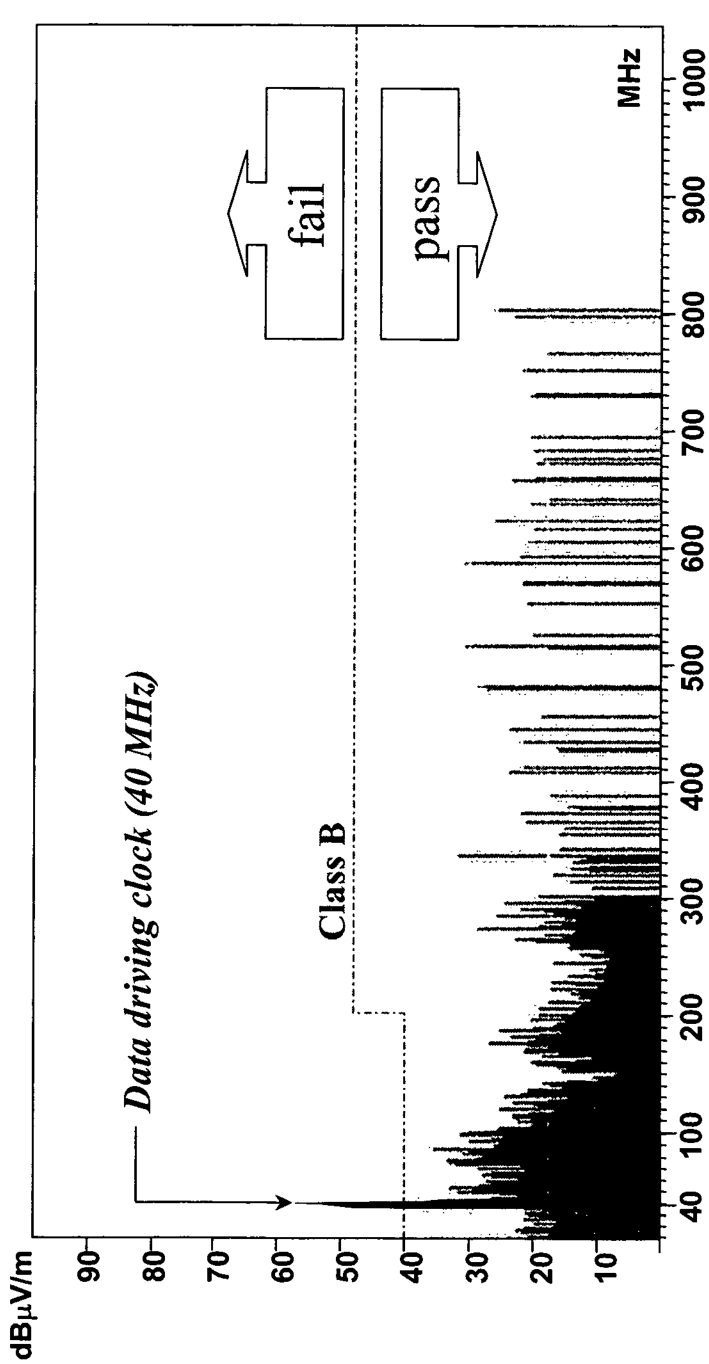
FIG. 1 an EMI radiation and norm limitations.
Figure 2:
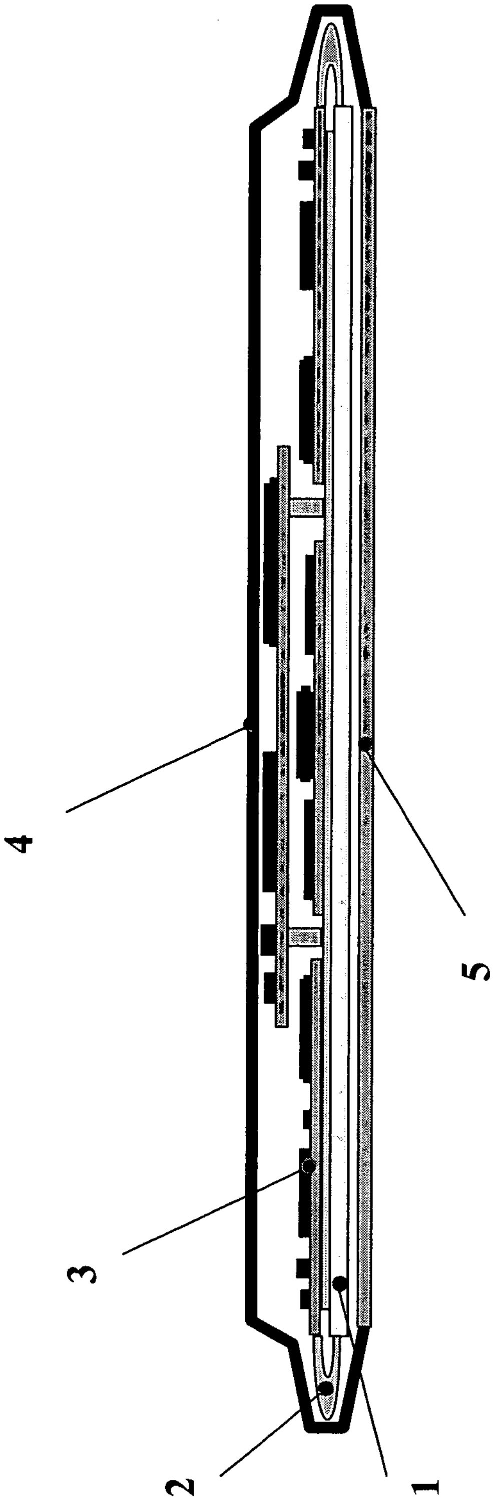
FIG. 2 a concept of front filtering against EMI.
Figure 3:
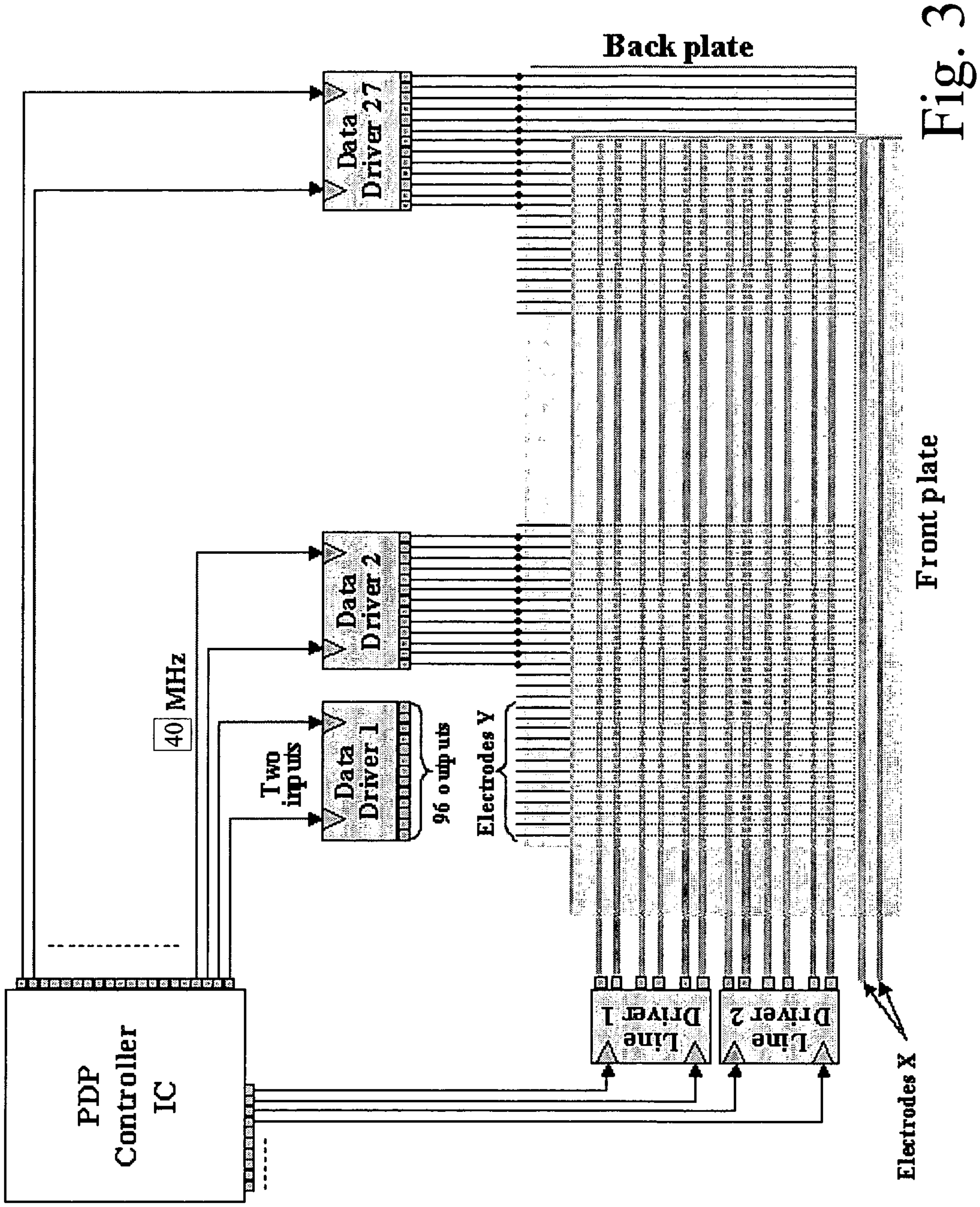
FIG. 3 a block diagram of PDP data driving.
Figure 4:
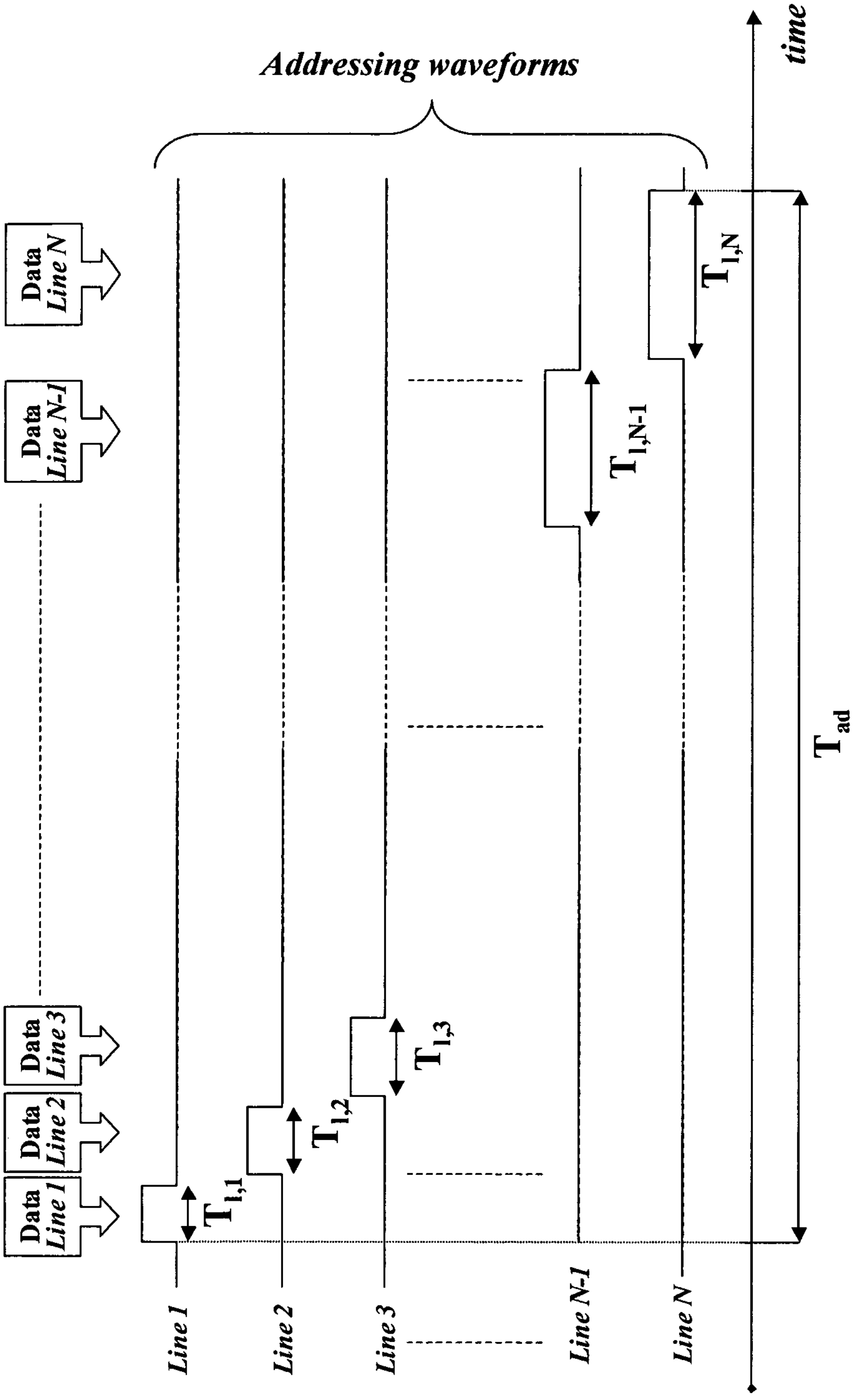
FIG. 4 a dynamic addressing concept according to the prior art.
Figure 11:
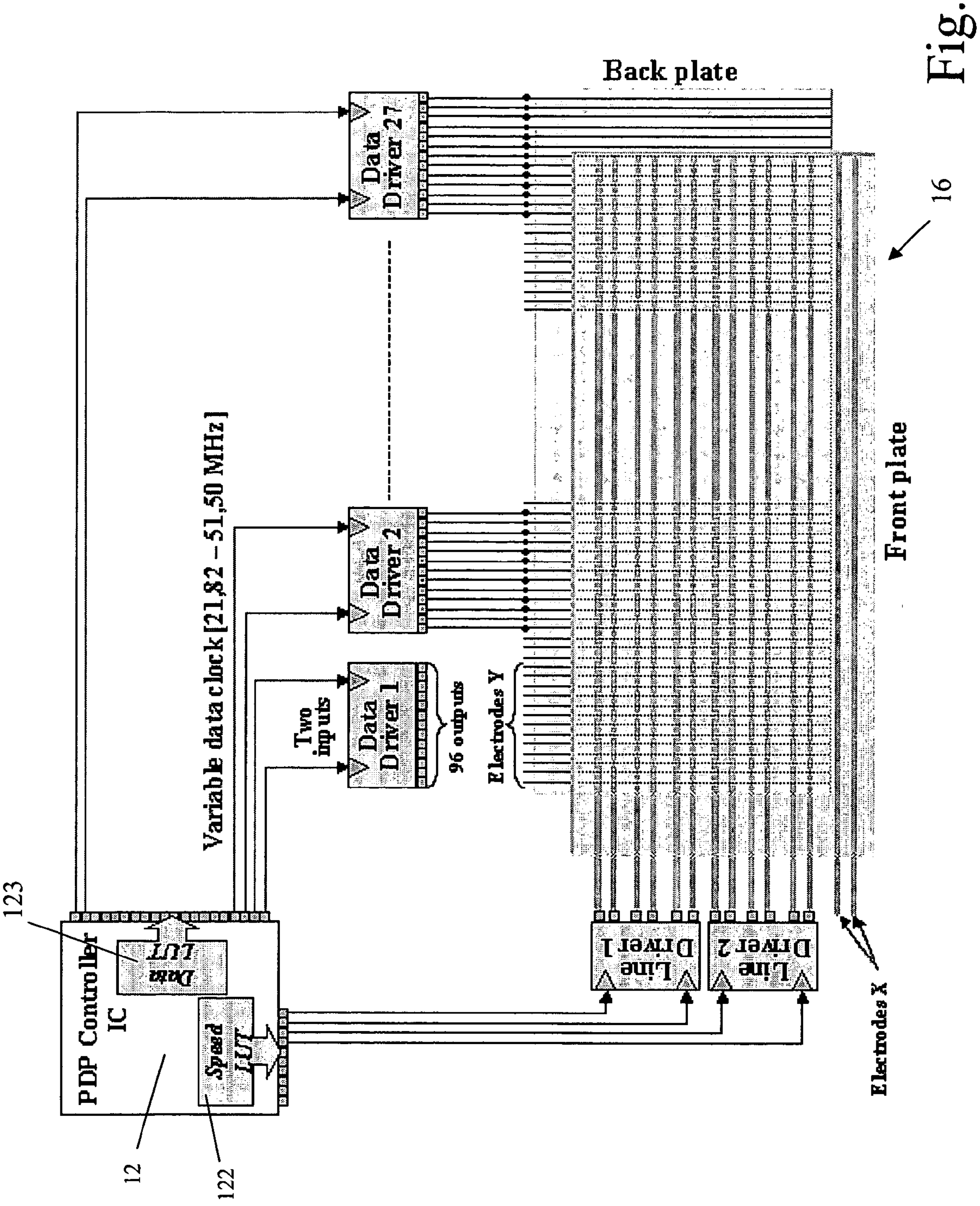
FIG. 11 a block diagram of the data driver according to the present invention.

FIG. 11 shows the driver part of FIG. 10 in detail. Essentially, the structure is the same as that of FIG. 3. The data drivers Data Driver 1, Data Driver 2, . . . Data Driver 27 drive the column electrodes Y of the back plate of the PDP and the line drivers Line Driver 1, Line Driver 2 drive the horizontal line electrodes X of the front plate of the PDP. Finally the control block 12 generates the SCAN and SUSTAIN pulses required to drive the PDP driver circuits. The length of the addressing signal (addressing speed) will be taken from a first LUT 122, preferably stored in the control block 12, and in fact for each line of the panel. At the same time, the information concerning the data driver clock for the data drivers is taken from a second LUT 123 also preferably stored in the control block 12 and used to send the data from serial/parallel conversion 15 and also to control the data driver loading. In the present example the data drivers are loaded with a variable clock frequency between 21.82 and 51.50 MHz.

The whole computation of all parameters from such concept will be made one time for a given panel technology and then stored in the PROM or LUT 122, 123 of the plasma dedicated IC.

The invention claimed is:

1. A method for driving a display device having a plurality of cells or pixels comprising the steps of:

loading addressing data into data driving means at a loading frequency, in order to activate cells or pixels before lighting;

applying an addressing signal to at least one of said plurality of cells or pixels for an addressing time period of which the length corresponds to an addressing frequency on the basis of said addressing data;

varying said addressing frequency for applying the addressing signal to cells or pixels with the vertical position of the line on the screen of said display device depending on the panel technology so that the pixels that are addressed employing a different clock frequency belong to different scan lines of the display device and the clock frequency is dependent on the vertical position of the line on the screen of the display device or said addressing frequency being variable with the presence or absence of a priming signal; and adapting continuously said loading frequency of the addressing data into data driving means to said addressing frequency for applying the addressing signal to cells or pixels such that an energy emitted by the data driving means is maintained at a nominal level while being spread over a frequency range depending on said continuously adapting said loading frequency.

2. The method according to claim 1, wherein said addressing frequency is changed dependent on the line on the screen of said display device by using a first LUT.

3. The method according to claim 1, wherein said loading frequency is changed dependent on the line on the screen of said display device by using a second LUT.

4. A device for driving a display device having a plurality of cells or pixels including:

data driving means for applying an addressing signal to at least one of said plurality of cells or pixels for an addressing time period of which the length corresponds to an addressing frequency according to the panel behaviour; and controlling means for loading addressing data into said data driving means at a loading frequency, in order to activate cells or pixels before lighting, said addressing frequency being controlled in dependency on the vertical position of the line on the screen of said display device depending on the panel technology so that the pixels that are addressed employing a different clock frequency belong to different scan lines of the display device and the clock frequency is dependent on the vertical position of the line on the screen of the display device or said addressing frequency being variable with the presence or absence of a priming signal; and wherein said controlling means is designed to continuously adapt said loading frequency into data driving means to said addressing frequency for applying the addressing signal to cells or pixels such that an energy emitted by the data driving means is maintained at a nominal level while being spread over a frequency range depending on the continuous adapting of the loading frequency.

5. The device according to claim 4, wherein said controlling means includes first memory means for a first LUT for changing said addressing frequency dependent on the line on the screen of said display device.

6. The device according to claim 4, wherein said controlling means includes second memory means for a second LUT for changing said loading frequency dependent on the line on the screen of said display device.

* * * * *